US009669356B2

United States Patent
Fukuda et al.

(10) Patent No.: US 9,669,356 B2
(45) Date of Patent: Jun. 6, 2017

(54) AIR POLLUTION CONTROL SYSTEM AND AIR POLLUTION CONTROL METHOD

(71) Applicant: MITSUBISHI HEAVY INDUSTRIES, LTD., Tokyo (JP)

(72) Inventors: Toshihiro Fukuda, Tokyo (JP); Seiji Kagawa, Tokyo (JP); Yoshito Tanaka, Tokyo (JP); Takuro Soeda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/760,122

(22) PCT Filed: Nov. 18, 2013

(86) PCT No.: PCT/JP2013/081052
§ 371 (c)(1),
(2) Date: Jul. 9, 2015

(87) PCT Pub. No.: WO2014/115408
PCT Pub. Date: Jul. 31, 2014

(65) Prior Publication Data
US 2015/0352490 A1 Dec. 10, 2015

(30) Foreign Application Priority Data

Jan. 24, 2013 (JP) .................................. 2013-011531

(51) Int. Cl.
*B01D 53/34* (2006.01)
*B01D 53/38* (2006.01)
(Continued)

(52) U.S. Cl.
CPC .......... *B01D 53/80* (2013.01); *B01D 53/501* (2013.01); *B01D 53/505* (2013.01); *B01D 53/75* (2013.01);
(Continued)

(58) Field of Classification Search
CPC ........ B01D 53/50; B01D 53/34; B01D 53/38; B01D 53/501; B01D 53/74; B01D 53/75;
(Continued)

(56) References Cited

U.S. PATENT DOCUMENTS 4,355,013 A * 10/1982 Bechthold .............. B01D 53/34
423/243.01
4,372,926 A * 2/1983 Gude ..................... B01D 53/50
423/243.08
(Continued)

FOREIGN PATENT DOCUMENTS

JP          S6013964 B2 *  4/1985  ............. B01D 53/50
JP          2-298315 A     12/1990
(Continued)

OTHER PUBLICATIONS

English translation of Written Opinion dated Oct. 2, 2014, issued in counterpart application No. PCT/JP2013/081052 (6 pages).
(Continued)

*Primary Examiner* — Timothy Vanoy
(74) *Attorney, Agent, or Firm* — Westerman, Hattori, Daniels & Adrian, LLP

(57) ABSTRACT

Provided is an air pollution control system including: a boiler; a denitration apparatus; an air heater; a precipitator; a desulfurization apparatus; a dehydrator; a concentration apparatus that is configured to remove some of water of dehydrated filtrate from the dehydrator; a spray drying apparatus provided with a spray unit that is configured to spray concentrated/dehydrated filtrate concentrated by the concentration apparatus; and a flue gas introduction line through which branch gas branched from the flue gas is introduced to the spray drying apparatus.

5 Claims, 6 Drawing Sheets

(51) Int. Cl.
*B01D 53/50* (2006.01)
*B01D 53/74* (2006.01)
*B01D 53/75* (2006.01)
*B01D 53/78* (2006.01)
*B01D 53/80* (2006.01)
*F26B 3/12* (2006.01)
*F23J 15/00* (2006.01)
*F23J 15/02* (2006.01)
*F23J 15/04* (2006.01)
*F23J 15/06* (2006.01)

(52) U.S. Cl.
CPC ........... *F23J 15/003* (2013.01); *F23J 15/006* (2013.01); *F23J 15/025* (2013.01); *F23J 15/04* (2013.01); *F23J 15/06* (2013.01); *F26B 3/12* (2013.01); *B01D 2251/404* (2013.01); *B01D 2257/302* (2013.01); *B01D 2257/404* (2013.01); *B01D 2257/602* (2013.01); *B01D 2258/0283* (2013.01); *F23J 2215/10* (2013.01); *F23J 2215/20* (2013.01); *F23J 2217/50* (2013.01); *F23J 2219/40* (2013.01); *Y02E 20/363* (2013.01); *Y02P 70/40* (2015.11)

(58) Field of Classification Search
CPC .............. B01D 53/78; B01D 2257/302; B01D 2258/0283
See application file for complete search history.

(56) References Cited

U.S. PATENT DOCUMENTS

| 7,625,537 | B2* | 12/2009 | Rader | .................... B01D 53/10 422/168 |
| 8,715,402 | B2* | 5/2014 | Ukai | ........................ B01D 1/14 423/243.08 |
| 2012/0240761 | A1* | 9/2012 | Ukai | ........................ B01D 1/14 95/16 |
| 2014/0083629 | A1* | 3/2014 | Fukuda | .................... C02F 1/048 159/4.02 |
| 2016/0250588 | A1* | 9/2016 | Ukai | ........................ B01D 1/14 |

FOREIGN PATENT DOCUMENTS

| JP | 6-23347 A | 2/1994 | |
| JP | 06023347 A * | 2/1994 | ................ C02F 1/04 |
| JP | 10-34105 A | 2/1998 | |
| JP | 10-137540 A | 5/1998 | |
| JP | 2012-196638 A | 10/2012 | |

OTHER PUBLICATIONS

International Search Report dated Feb. 10, 2014, issued in corresponding application No. PCT/JP2013/081052 (1 page).
Written Opinion dated Feb. 10, 2014, issued in corresponding application No. PCT/JP2013/081052 (4 pages).
Office Action dated Aug. 30, 2016, issued in counterpart Japanese Patent Application No. 2013-011531, with English translation. (10 Pages).

* cited by examiner

AIR POLLUTION CONTROL SYSTEM AND AIR POLLUTION CONTROL METHOD

FIELD

The present invention relates to an air pollution control system and an air pollution control method for treating a flue gas discharged from a boiler.

BACKGROUND

In the past, there has been known an air pollution control system that treats a flue gas discharged from a boiler installed in a thermal power facility or the like. The air pollution control system includes a denitration apparatus that removes nitrogen oxides from the flue gas discharged from the boiler, an air heater that recovers heat of the flue gas having passed through the denitration device, a precipitator that removes soot and dust contained in the flue gas after heat recovery, and a desulfurization apparatus that removes sulfur oxides contained in the flue gas after dust removal. As the desulfurization apparatus, a wet desulfurization apparatus is generally used, which removes sulfur oxides contained in a flue gas by bringing a limestone absorbent or the like into gas-liquid contact with the flue gas.

Recently, due to enhancement of wastewater regulation, elimination of wastewater in an air pollution control facility has been earnestly desired and an advent of an air pollution control facility for achieving the elimination of wastewater has been earnestly desired in which an operation can be stably performed.

As a facility for performing the elimination of wastewater, the applicant has previously proposed a technique in which a spray drying apparatus is used to dry dehydrated filtrate obtained by separating gypsum from desulfurization wastewater and the desulfurization wastewater is spray-dried using a boiler flue gas (Patent Literature 1).

CITATION LIST

Patent Literature

Patent Literature 1: JP 2012-196638 A

SUMMARY

Technical Problem

Meanwhile, in a case of realizing the elimination of wastewater using a spray drying apparatus which is configured to partially branch a boiler flue gas from a flue gas duct and to spray and gasify dehydrated filtrate from a desulfurization apparatus, the spray drying apparatus for completely evaporating and solidifying the sprayed dehydrated filtrate is essential. For this reason, since the heat quantity (heat quantity of a branch gas from a boiler flue gas) sufficient to evaporation and solidification and the sufficient residence time of wastewater spray droplets (gas-liquid contact time) within a spray drying apparatus body are required, there is a problem that the size of the spray drying apparatus body becomes larger in large-sized plant facilities which require the large quantity of wastewater.

In addition, since the large quantity of wastewater is required and the amount of the branch gas of the boiler flue gas contributed to the drying increases, the heat exchange amount of the air heater is reduced. As a result, since the temperature of an inlet gas after heat exchange with the air heater to be introduced into the boiler falls, it is necessary to increase the amount of heating by the boiler, so that there is a problem that the fuel consumption amount of the boiler increases.

An advent of an air pollution control system has been earnestly desired which can make the spray drying apparatus compact, at the time of performing the elimination of wastewater on the desulfurization wastewater discharged from the desulfurization apparatus.

The present invention has been made in view of the above problems and an object thereof is to provide an air pollution control system and an air pollution control method which can perform the elimination of wastewater on the desulfurization wastewater discharged from the desulfurization apparatus using compact facilities.

Solution to Problem

According to a first aspect of the present invention in order to solve the problems, there is provided an air pollution control system including: a boiler that is configured to combust a fuel; an air heater that is configured to recover heat of a flue gas discharged from the boiler; a precipitator that is configured to remove soot and dust contained in the flue gas after heat recovery; a desulfurization apparatus that is configured to remove sulfur oxides contained in the flue gas after dust removal, using an absorbent; a dehydrator that is configured to remove gypsum from absorber slurry discharged from the desulfurization apparatus; a concentration apparatus that is configured to remove some of water of dehydrated filtrate from the dehydrator to make concentrated/dehydrated filtrate; a spray drying apparatus provided with a spray unit that is configured to spray the dehydrated filtrate in which water is concentrated; a flue gas introduction line through which some of the branch gas branched from the flue gas is introduced to the spray drying apparatus from a main flue gas duct; and a flue gas supply line through which the flue gas returns to the main flue gas duct, the flue gas being obtained after the dehydrated filtrate is dried by the spray drying apparatus.

According to a second aspect of the present invention, there is provided the air pollution control system according to the first aspect, wherein the concentration apparatus is an evaporation apparatus and includes a heater for heating the dehydrated filtrate and an evaporator for separating vapor from the dehydrated filtrate which has been heated.

According to a third aspect of the present invention, there is provided the air pollution control system according to the first or second aspect, including a filter that is configured to remove solid contents contained in the concentrated/dehydrated filtrate to be fed into the spray drying apparatus.

According to a fourth aspect of the present invention, there is provided the air pollution control system according to any one of the first to third aspects, wherein the flue gas supply line is provided with a solid content separator that is configured to perform a solid-gas separation on the solid contents contained in the flue gas.

According to a fifth aspect of the present invention, there is provided an air pollution control method in which after heat of a flue gas discharged from a boiler configured to combust a fuel is recovered by an air heater, sulfur oxides contained in the flue gas after heat recovery are removed using an absorbent in a desulfurization apparatus, the method including: reducing a volume of dehydrated filtrate obtained by removing gypsum from desulfurized wastewater discharged from the desulfurization apparatus, using a concentration apparatus; and performing spray-drying on concentrated/dehydrated filtrate, which is reduced in volume, using some of the flue gas.

Advantageous Effects of Invention

According to the present invention, the dehydrated filtrate separated from the desulfurized wastewater is reduced in volume by the concentration apparatus to make the concentrated/dehydrated filtrate, thereby reducing the amount of spray drying treatment, so that it is possible to make the size of the spray drying apparatus compact.

DESCRIPTION OF EMBODIMENTS

Preferred embodiments of the invention will be described in detail below with reference to the accompanying drawings. Meanwhile, the invention is not limited by these embodiments. Further, when the invention includes a plurality of embodiments, the invention also includes the combination of the respective embodiments.

First Embodiment

Figure 1:
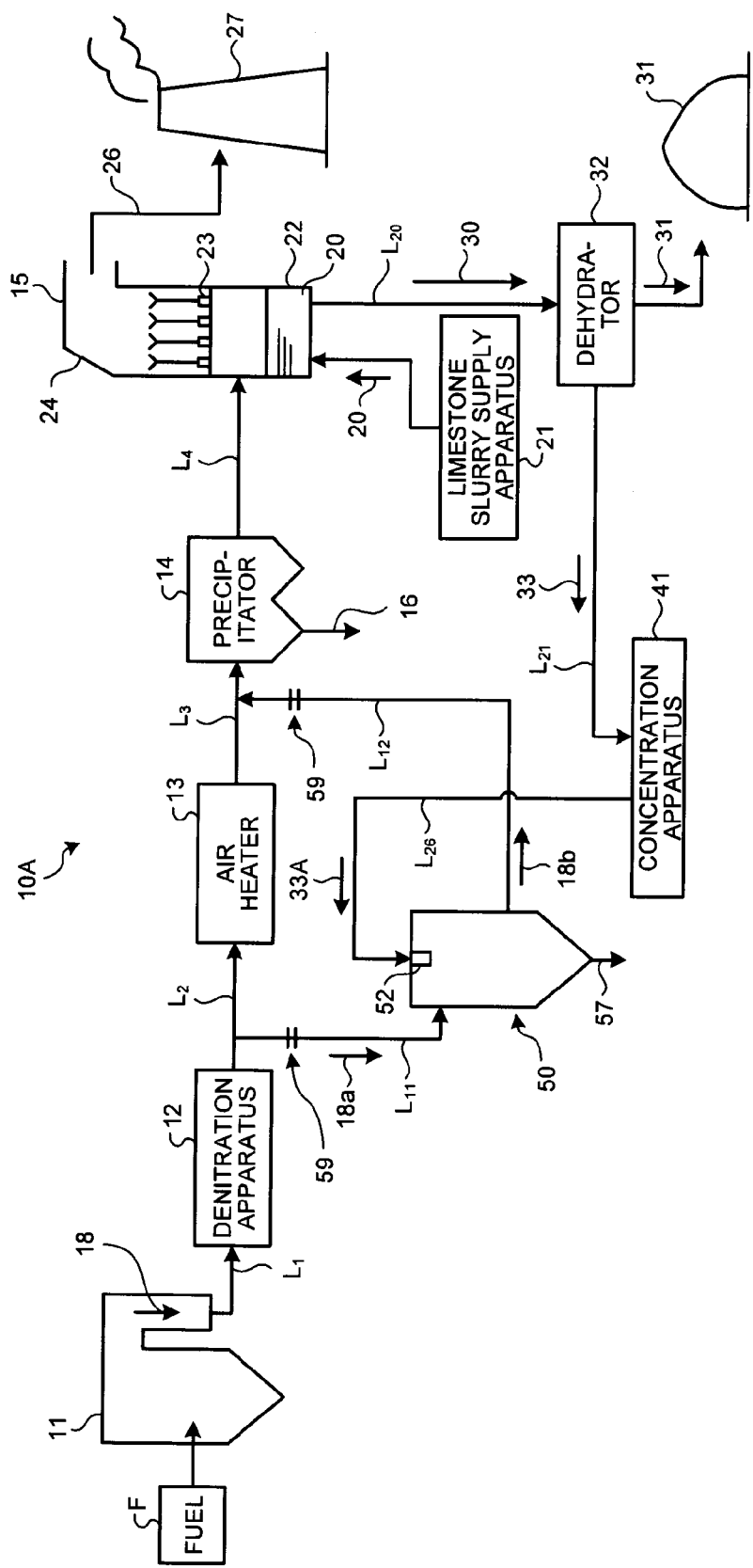
FIG. 1 is a schematic configuration diagram of an air pollution control system according to a first embodiment.

FIG. 1 is a schematic configuration diagram of an air pollution control system according to a first embodiment. An air pollution control system 10A exemplified in FIG. 1 is a plant which removes hazardous substances such as nitrogen oxides ($NO_x$), sulfur oxides ($SO_x$), soot and dust (PM), or mercury (Hg) from boiler flue gas (hereinafter, referred to as "flue gas") 18 discharged from a boiler 11 such as a coal combustion boiler using, for example, coals or residual solid substances as a fuel or an oil combustion boiler using heavy oil or residual oil as a fuel.

The air pollution control system 10A according to the present embodiment includes a boiler 11 that is configured to combust a fuel F, a denitration apparatus 12 that is configured to remove nitrogen oxides in a flue gas 18 discharged from the boiler 11, an air heater 13 that is configured to recover heat of the flue gas 18 after denitration, a precipitator 14 that is configured to remove soot and dust contained in the flue gas 18 after heat recovery in the form of collected dust ash 16, a desulfurization apparatus 15 that is configured to remove sulfur oxides contained in the flue gas 18 after dust removal using limestone slurry 20 which is an absorbent, a dehydrator 32 that is configured to recover gypsum 31 from an absorbent 30 serving as desulfurized wastewater discharged from the desulfurization apparatus 15, a concentration apparatus 41 that is configured to remove some of water of dehydrated filtrate 33 from the dehydrator 32, a spray drying apparatus 50 provided with a spray unit that is configured to spray concentrated/dehydrated filtrate 33A concentrated by the concentration apparatus 41, a flue gas introduction line $L_{11}$ through which branch gas 18a branched from the flue gas 18 is introduced to the spray drying apparatus 50, and a flue gas supply line $L_{12}$ through which flue gas 18b returns to a main flue gas duct, the flue gas 18b being obtained after the concentrated/dehydrated filtrate 33A is dried by the spray drying apparatus 50. Reference numeral $L_{26}$ represents a concentrated/dehydrated filtrate supply line through which the concentrated/dehydrated filtrate 33A is fed to the spray drying apparatus 50.

Thus, the spray drying apparatus 50 performs spray-drying on the concentrated/dehydrated filtrate 33A obtained by removing some of water, in which the gypsum 31 is recovered, using the branch gas 18a which is introduced thereto, and thus it is possible to stably perform the elimination of wastewater on the desulfurization wastewater discharged from the desulfurization apparatus 15.

The denitration apparatus 12 is an apparatus that removes nitrogen oxides contained in the flue gas 18 supplied from the boiler 11 through a gas supply line L1 and includes a denitration catalyst layer (not illustrated) therein. A reducing agent injector (not illustrated) is disposed on a front stream side of the denitration catalyst layer, and a reducing agent is injected into the flue gas 18 from the reducing agent injector. Here, for example, ammonia, urea, or ammonium chloride is used as the reducing agent. The nitrogen oxides contained in the flue gas 18 introduced to the denitration apparatus 12 comes into contact with the denitration catalyst layer, so that the nitrogen oxides contained in the flue gas 18 are decomposed into nitrogen gas ($N_2$) and water ($H_2O$) and removed. In addition, as the amount of chlorine (Cl) of the mercury contained in the flue gas 18 increases, the ratio of bivalent mercury chloride soluble in water increases and mercury is easily collected by the desulfurization apparatus 15 to be described below.

Meanwhile, the above-described denitration apparatus 12 is not essential, and when the concentration of the nitrogen oxide or mercury contained in the flue gas 18 discharged from the boiler 11 is low or when these substances are not contained in the flue gas 18, the denitration apparatus 12 may not be provided.

The air heater 13 is a heat exchanger that recovers the heat in the flue gas 18 which is supplied through a flue gas supply line $L_2$ after the nitrogen oxides are removed by the denitration apparatus 12. Since the temperature of the flue gas 18, which has passed through the denitration apparatus 12, is as high as about 300 to 400° C., heat exchange is performed between the high-temperature flue gas 18 and room-temperature combustion air by the air heater 13. Combustion air of which the temperature becomes high by the heat exchange is supplied to the boiler 11. Meanwhile, the flue gas 18, which is heat-exchanged with the room-temperature combustion air, is cooled to a temperature of about 150° C.

The precipitator 14 is to remove soot and dust contained in the flue gas 18, which is supplied through a gas supply line $L_3$, after the heat recovery. Examples of the precipitator 14 include an inertial precipitator, a centrifugal precipitator, a filtration-type precipitator, an electronic precipitator, a washing precipitator, but are not particularly limited thereto.

The desulfurization apparatus 15 is an apparatus that removes the sulfur oxides contained in the flue gas 18, which is supplied through a gas supply line $L_4$ after the soot and dust are removed, in a wet manner. For example, limestone slurry (an aqueous solution obtained by dissolving limestone powder in water) 20 is used as an alkaline absorbent in the desulfurization apparatus 15, and a temperature in the apparatus is adjusted to about 30 to 80° C., for example. The limestone slurry 20 is supplied to a liquid reservoir in a column bottom portion 22 of the desulfurization apparatus 15 from a limestone slurry supply apparatus 21. The limestone slurry 20, which is supplied to the column bottom portion 22 of the desulfurization apparatus 15, is fed to a plurality of nozzles 23 provided in the desulfurization apparatus 15 through an absorbent supply line (not illustrated) and is ejected from the nozzles 23 toward a column top portion 24. The flue gas 18 rising from the column bottom portion 22 of the desulfurization apparatus 15 comes into gas-liquid contact with the limestone slurry 20 ejected from the nozzles 23, so that the sulfur oxides and the mercury chlorides contained in the flue gas 18 are absorbed by the limestone slurry 20 and are separated and removed from the flue gas 18. The flue gas 18 purified by the limestone slurry 20 is discharged from the column top portion 24 of the desulfurization apparatus 15 as a purified gas 26 and is discharged from a stack 27 to the outside of the system.

In the interior of the desulfurization apparatus 15, the sulfur oxide $SO_x$ contained in the flue gas 18 reacts with the limestone slurry 20 as represented by the following Formula (1).

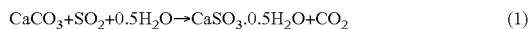

$$CaCO_3 + SO_2 + 0.5H_2O \rightarrow CaSO_3 \cdot 0.5H_2O + CO_2 \qquad (1)$$

In addition, the limestone slurry 20, which has absorbed $SO_x$ contained in the flue gas 18, is oxidized by air (not illustrated) supplied to the column bottom portion 22 of the desulfurization apparatus 15 and reacts with the air as represented by the following Formula (2).

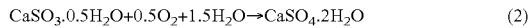

$$CaSO_3 \cdot 0.5H_2O + 0.5O_2 + 1.5H_2O \rightarrow CaSO_4 \cdot 2H_2O \qquad (2)$$

In this way, the $SO_x$ contained in the flue gas 18 is captured in the form of gypsum $CaSO_4 \cdot 2H_2O$ in the desulfurization apparatus 15.

In addition, as described above, while a liquid, which is stored in the column bottom portion 22 of the desulfurization apparatus 15 and is pumped up, is used as the limestone slurry 20, the gypsum $CaSO_4 \cdot 2H_2O$ is mixed with the pumped limestone slurry 20 by Reaction Formulae (1) and (2) with the operation of the desulfurization apparatus 15. In the following description, limestone gypsum slurry (limestone slurry with which the gypsum has been mixed) to be pumped is referred to as an absorbent.

The absorbent (limestone gypsum slurry) 30 used for desulfurization is discharged to the outside from the column bottom portion 22 of the desulfurization apparatus 15 and is fed to the dehydrator 32 through an absorbent line $L_{20}$ to be dehydrated here. The dehydrated filtrate 33 becomes desulfurization wastewater, but includes heavy metals such as mercury or halogen ions such as $Cl^-$, $Br^-$, $I^-$, and $F^-$.

The dehydrator 32 is to separate a solid component containing the gypsum 31 of the absorbent 30 from a liquid component of the dehydrated filtrate 33. For example, a belt filter, a centrifugal separator, or a decanter-type centrifugal settler is used as the dehydrator 32. The gypsum 31 is separated from the absorbent 30 discharged from the desulfurization apparatus 15, by the dehydrator 32. At this time, mercury chlorides contained in the absorbent 30 are separated from liquid together with the gypsum 31 while being absorbed on the gypsum 31. The separated gypsum 31 is discharged outside of the system (hereinafter, referred to as an "outside of the system").

Meanwhile, the dehydrated filtrate 33, which is a separate liquid from the dehydrator 32, is fed to the spray drying apparatus 50 to be evaporated and dried and thus the elimination of wastewater is achieved.

In the present embodiment, the concentration apparatus 41 is interposed in a dehydrated filtrate supply line $L_{21}$ to concentrate the dehydrated filtrate 33 fed from the dehydrator 32.

The concentration apparatus 41 is not particularly limited as long as concentrating the dehydrated filtrate 33 and reducing the volume thereof, but can use, for example, an evaporation apparatus for evaporating water by heating the dehydrated filtrate 33 or a vacuum apparatus for depressurizing and removing water using a vacuum pump.

Then, the dehydrated filtrate 33 is reduced in volume by the concentration apparatus 41 to make the concentrated/dehydrated filtrate 33A, thereby reducing the amount of spray drying treatment, so that it is possible to make the size of the spray drying apparatus 50 compact.

The concentrated/dehydrated filtrate 33A reduced in volume may be temporarily stored in a concentrated/dehydrated filtrate tank (not illustrated in FIG. 1).

In addition, the spray drying apparatus 50 includes a gas introduction unit to which the branch gas 18a branched from the flue gas 18 is introduced through the flue gas introduction line $L_{11}$ branched from the flue gas supply line $L_2$ which is a main line of the flue gas 18 supplied from the boiler 11 and a spray unit 52 which is configured to disperse or spray the concentrated/dehydrated filtrate 33A. Then, the dispersed or sprayed dehydrated filtrate 33 is evaporated and dried by heat of the flue gas 18 to be introduced. Furthermore, reference numeral $L_{12}$ represents a flue gas supply line through which the flue gas 18b contributed to the drying in the spray drying apparatus 50 returns to the gas supply line $L_3$. A damper unit 59 is interposed in the flue gas introduction line $L_{11}$ and the flue gas supply line $L_{12}$ to stop inflow and discharge of the branch gas 18a and the flue gas 18b.

In the present embodiment, since the branch gas 18a flowing into the air heater 13 is branched from the flue gas supply line $L_2$ through the flue gas introduction line $L_{11}$, the temperature of the gas is high (300 to 400° C.) and the spray-drying of the dehydrated filtrate 33 can be efficiently performed.

Figure 6:
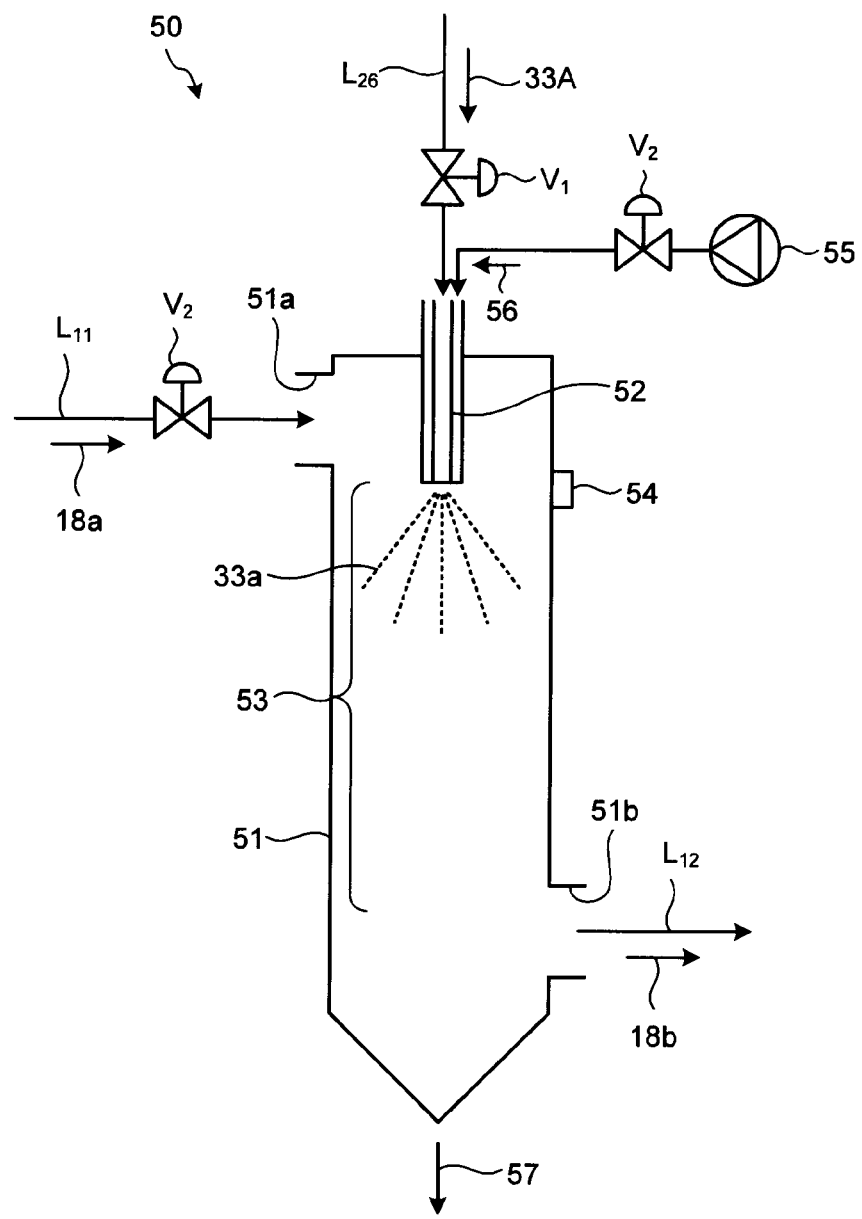
FIG. 6 is a schematic diagram of a spray drying apparatus for dehydrated filtrate according to the first embodiment.

FIG. 6 is a schematic diagram illustrating an example of the spray drying apparatus for the dehydrated filtrate according to the present embodiment. As illustrated in FIG. 6, the spray drying apparatus 50 according to the present embodiment includes: the spray unit 52 which is provided in a spray drying apparatus body 51 to spray the concentrated/dehydrated filtrate 33A; an inlet 51a which is provided in the spray drying apparatus body 51 and is configured to introduce the branch gas 18a for drying a spray liquid 33a; a drying zone 53 which is provided in the spray drying apparatus body 51 to dry the concentrated/dehydrated filtrate 33A using the branch gas 18a; an outlet 51b which discharges the flue gas 18b contributed to the drying; and a deposit monitoring unit 54 which monitors a state where a deposit is attached to the spray unit 52. Reference numeral 57 represents a separated solid matter and reference numerals $V_1$ and $V_2$ represent flow regulating valves.

Incidentally, using the spray unit 52, the concentrated/dehydrated filtrate 33A is sprayed into the inside of the spray drying apparatus body 51 by air 56 supplied from a compressor 55 at a predetermined flow rate and with a predetermined particle size of sprayed droplets.

Here, as long as the spray unit 52 sprays the concentrated/dehydrated filtrate 33A in the form of droplets having a predetermined particle size, the type thereof is not limited. For example, a spray unit such as a two-fluid nozzle or a rotary atomizer may be used. The two-fluid nozzle is suitable to spray a relatively small amount of concentrated/dehydrated filtrate 33A and the rotary atomizer is suitable to spray a relatively large amount of concentrated/dehydrated filtrate 33A.

In addition, the number of nozzles is not one, and a plurality of nozzles may be provided according to the amount of concentrated/dehydrated filtrate to be treated.

In the present invention, the dehydrated filtrate 33A is concentrated at the concentration apparatus 41 and the volume-reduced concentrated/dehydrated filtrate 33A is spray-dried, so that it is possible to make the spray drying apparatus 50 compact.

In the present embodiment, it is not intended that the dehydrated filtrate 33 separated by the dehydrator 32 is intactly supplied to the spray drying apparatus 50 and is subjected to the elimination of wastewater, but the dehydrated filtrate 33 is once concentrated at the concentration apparatus 41 to achieve the reduction in volume.

Consequently, even when being applied to large-scale boiler plant facilities, it is possible to make the size of the spray drying apparatus body 51 compact and to also reduce the amount of the branch gas 18a of the flue gas 18.

Accordingly, the required amount of wastewater becomes much in a case of the large-sized plant facilities, but since the amount of the branch gas 18a of the flue gas 18 is also reduced in this case, it is possible to reduce the deterioration in heat exchange amount of the air heater 13. As a result, lowering of the temperature of the boiler inlet gas, which is introduced into the boiler 11 and is heated by the air heater 13, can be also reduced, so that it is possible to prevent the increase in the fuel consumption amount of the boiler.

Second Embodiment

Figure 2:
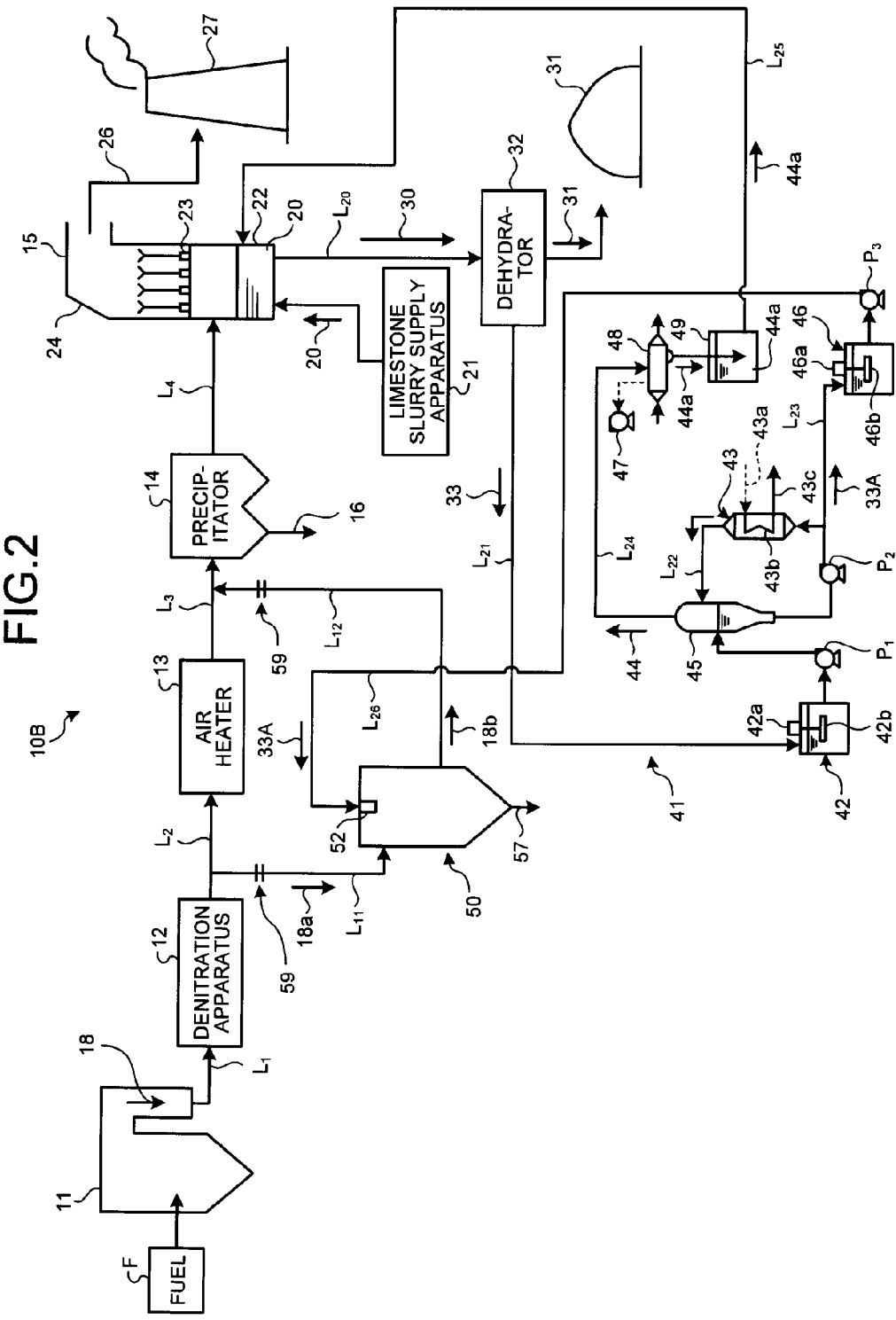
FIG. 2 is a schematic configuration diagram of an air pollution control system according to a second embodiment.

FIG. 2 is a schematic configuration diagram of an air pollution control system for dehydrated filtrate according to a second embodiment. The same members as those in the air pollution control system according to the first embodiment are denoted by the same reference numerals and the description thereof will not be presented.

As illustrated in FIG. 2, an air pollution control system 10B according to the present embodiment is configured to use an evaporation drying unit as a concentration apparatus 41.

As illustrated in FIG. 2, the concentration apparatus 41 according to the present embodiment includes: a dehydrated filtrate storage tank 42 which is interposed in a dehydrated filtrate supply line $L_{21}$ to temporarily store dehydrated filtrate 33; an evaporation apparatus 45 which includes a liquid feeding pump $P_1$ for feeding the dehydrated filtrate 33 discharged from the dehydrated filtrate storage tank 42 and a circulation line $L_{22}$ through which the fed dehydrated filtrate 33 is introduced and which is interposed with a heat exchanger 43, thereby circulating the dehydrated filtrate 33 heated by the heat exchanger 43, to remove water vapor 44 from the dehydrated filtrate 33 which has been heated; a concentrated liquid storage tank 46 which temporarily stores concentrated/dehydrated filtrate 33A, which is concentrated at the evaporation apparatus 45, through a concentrated/dehydrated filtrate supply line $L_{23}$ provided with a liquid feeding pump $P_2$; and the concentrated/dehydrated filtrate 33A discharged from the concentrated liquid storage tank 46. Then, a predetermined amount of the concentrated/dehydrated filtrate 33A is supplied to a spray drying apparatus 50 through a pump $P_3$, which is interposed in a dehydrated filtrate supply line $L_{26}$, from the concentrated liquid storage tank 46 to achieve the elimination of wastewater.

In FIG. 2, reference numerals 42a and 46a represent stirrers, reference numerals 42b and 46b represent stirring blades, reference numeral 43b represents a heat exchanger, and reference numeral 43c represents condensed water.

The present embodiment is configured to exchange indirectly heat by supplying steam 43a as the heat exchanger 43 for heating the dehydrated filtrate 33, but the present invention may use, for example, an electric heater for heating instead of the steam 43a without being limited thereto.

In addition, the water vapor 44 generated in the evaporation apparatus 45 is condensed by a cooler 48 interposed in a vacuum line $L_{24}$ which is evacuated by a vacuum pump 47. Then, condensed condensate 44a is temporarily stored in a condensed water tank 49. Thereafter, the condensate 44a is supplied into a column bottom portion 22 of a desulfurization apparatus 15 through a line $L_{25}$.

In the present embodiment, the generated water vapor 44 is cooled by the cooler 48 and is re-used as condensed water in the desulfurization apparatus 15, but it may spread directly out to the atmosphere from the evaporation apparatus 45 or may return to the gas supply line $L_4$ of the desulfurization apparatus 15.

Here, the description will be made with respect to an example where the amount of the desulfurized wastewater discharged from the desulfurization apparatus 15 is 20 t/hour and is condensed to 1/7 using the concentration apparatus 41.

When the amount of the desulfurized wastewater is 20 t/hour, for example, when total dissolved solids (TDS) are 60,000 mg/L, if being condensed to about seven times by a concentration process, the TDS becomes 420,000 mg/L and the amount of the wastewater becomes 2.9 t/hour (1/7).

At this time, a heat quantity (the amount of the branch gas 18a of the flue gas 18 discharged from the boiler) required to the evaporation for the elimination of wastewater in the spray drying apparatus 50 becomes about one-seventh.

Accordingly, a necessary cross-sectional area of a spray drying apparatus body 51 of the spray drying apparatus 50 becomes also about one-seventh.

As a result, the column diameter of the spray drying apparatus body 51 can be reduced to about 60%, thereby making the size compact.

Third Embodiment

Figure 3:
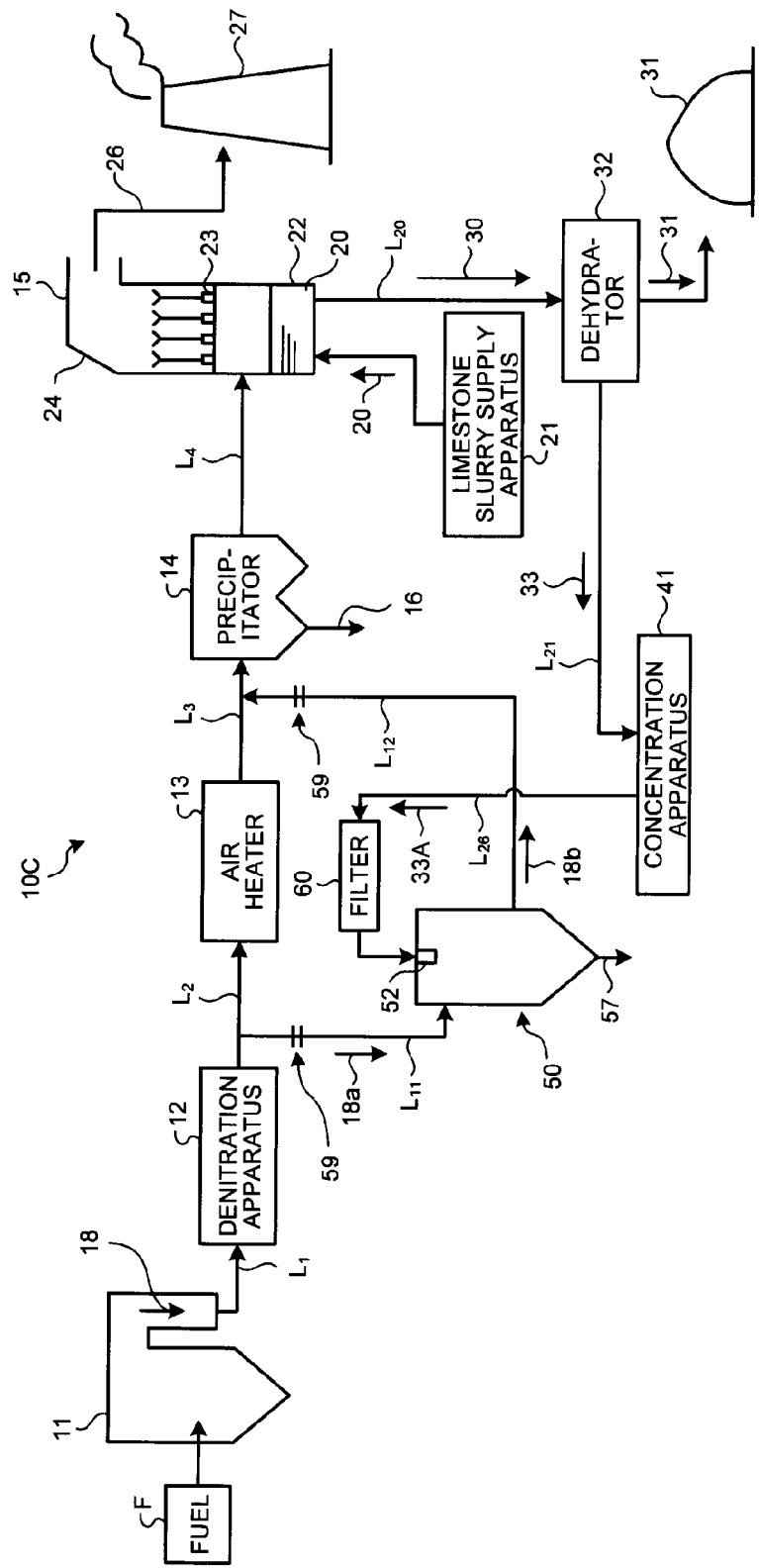
FIG. 3 is a schematic configuration diagram of an air pollution control system according to a third embodiment.

FIG. 3 is a schematic configuration diagram of an air pollution control system for dehydrated filtrate according to a third embodiment. The same members as those in the air pollution control system according to the first embodiment are denoted by the same reference numerals and the description thereof will not be presented.

In a concentration process of a concentration apparatus 41, solid contents are precipitated in the solution when components dissolved in dehydrated filtrate 33 exceed saturation solubility.

The solid contents may cause blockage of pipes, nozzles or the like at the time of spraying droplets in a spray drying apparatus 50.

The present embodiment is configured in such a manner that a filter 60 is interposed in a concentrated/dehydrated filtrate supply line $L_{26}$ at a front stream introduction side of the spray drying apparatus 50 in an air pollution control system 10C according to the present embodiment illustrated in FIG. 3, thereby preventing the blockage of, for example, a spray unit 52 or the pipes. The filter 60 is preferably interposed immediately before the spray drying apparatus 50.

In addition, as a countermeasure of a scale formation in the pipes or nozzles, it may replace industrial water in the spray drying apparatus 50 or the pipes during a stop of the concentration process.

Alternatively, the industrial water in the pipes may be periodically cleaned.

For example, regular cleaning may be once performed for two hours during the operation to remove the scale formation.

Preferably, the cleaning is sequentially performed from the concentration apparatus 41 side on the concentrated/dehydrated filtrate supply line $L_{26}$ toward the spray drying apparatus 50.

Thus, even when being once precipitated by the concentration, the components dissolved by the desulfurization apparatus 15 are removed by the filter 60, which is a solid content separator, before being introducing into the spray drying apparatus 50, so that the dissolved components can be prevented from being carried.

In addition, since the concentrated/dehydrated filtrate supply line $L_{26}$ is cleaned every predetermined time, the scale formation which brings about the blockage is prevented.

Fourth Embodiment

Figure 4:
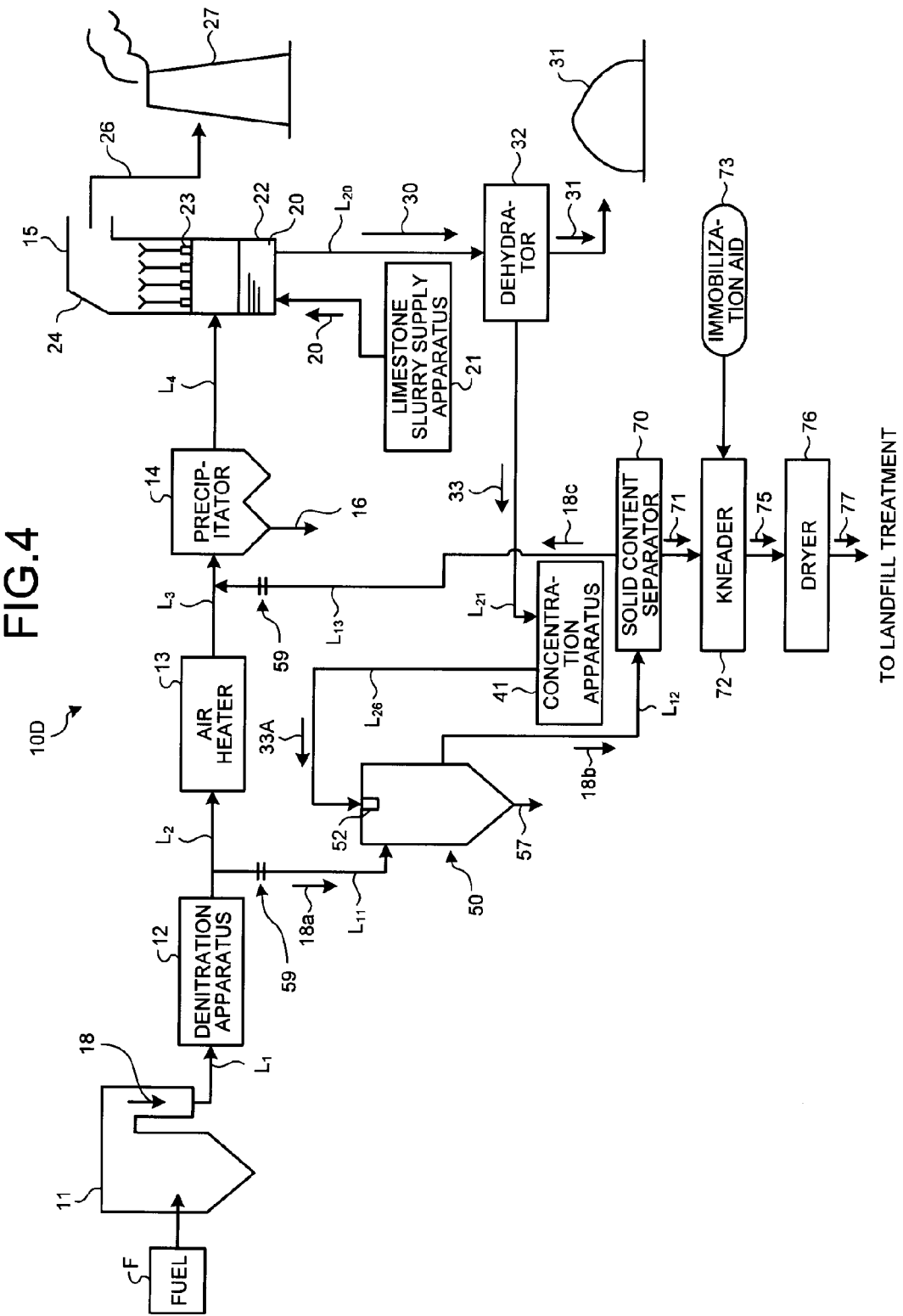
FIG. 4 is a schematic configuration diagram of an air pollution control system according to a fourth embodiment.

FIG. 4 is a schematic configuration diagram of an air pollution control system for dehydrated filtrate according to a fourth embodiment. The same members as those in the air pollution control system according to the first embodiment are denoted by the same reference numerals and the description thereof will not be presented.

Here, since dissolved components (salts) dissolved in the desulfurization wastewater are contained in a flue gas 18b to be discharged from a spray drying apparatus 50 when being concentrated by a concentration apparatus 41 and being intactly dried by the spray drying apparatus 50, the dissolved components are contained in collected dust ash 16 when being supplied and collected to/in a precipitator 14.

When the collected dust ash 16 containing the dissolved components is intactly subjected to a landfill treatment, there is a problem of re-elution of the dissolved components from the collected dust ash 16.

In the present embodiment, the flue gas 18b is treated so as to prevent an occurrence of the re-elution of the dissolved components even when the collected dust ash 16 is subjected to the landfill.

As illustrated in FIG. 4, in an air pollution control system 10D according to the present embodiment, a solid content separator 70 is interposed in a flue gas supply line $L_{12}$ to perform the solid-gas separation on solid contents 71 which are solid components contained in a flue gas 18b discharged from the spray drying apparatus 50.

An example of the solid content separator 70 is an apparatus such as a cyclone or a bag filter which separates solid contents contained in a gas, and the separated solid contents 71 are then sent to a kneader 72 and are kneaded therein.

In addition, a flue gas 18c from which the solid contents 71 are separated returns to a gas supply line $L_3$ through a flue gas supply line $L_{13}$.

In addition, since the separated solid contents 71 intactly contain water even when being subjected to the drying and are re-dissolved during the landfill in this state, they are subjected to a kneading treatment together with an immobilization aid 73 in the kneader 72 and are subjected to an immobilization treatment.

In the present embodiment, the solid contents 71 and the immobilization aid 73 are charged into the kneader 72 and are kneaded therein for a predetermined time, so that the solid contents 71 are subjected to the immobilization treatment.

Here, the collected dust ash 16 recovered by the precipitator 14 can be used as the immobilization aid 73 for performing the immobilization treatment on the solid contents 71 to be easily eluted.

The predetermined amount of collected dust ash 16 is added and kneaded to/with the kneader 72, so that the immobilization treatment is reliably performed.

In addition, for example, calcium carbonate (limestone), calcium sulfate (gypsum), or a cement material is added instead of the collected dust ash 16, and thus the immobilization treatment may be reliably performed.

Here, a combination of, for example, $3CaO.SiO_2$ and $3CaO.Al_2O_3$ is used as the cement material and more reliably immobilizes the eluted matters. As the cement material, for example, Portland cement can be exemplified.

As water used to solidify each component by dissolving and mixing it, for example, steam or wastewater (desulfurization wastewater or the like), industrial water, or desulfurization absorbent slurry can be appropriately used.

A kneaded matter 75 to which the immobilization aid 73 is charged is then dried by a dryer 76, resulting in becoming a dry matter 77. Although the dry matter 77 is separately subjected to the landfill treatment, since it has been subjected to the immobilization treatment at the time of the landfill, the re-elution does not occur and the landfill treatment can be performed in consideration of an environment.

Thus, since the solid contents are separated from the flue gas 18b contributed to the drying in the spray drying apparatus 50, the load on the precipitator 14 is also reduced and it is not necessary to increase the capacity of the precipitator 14.

Figure 5:
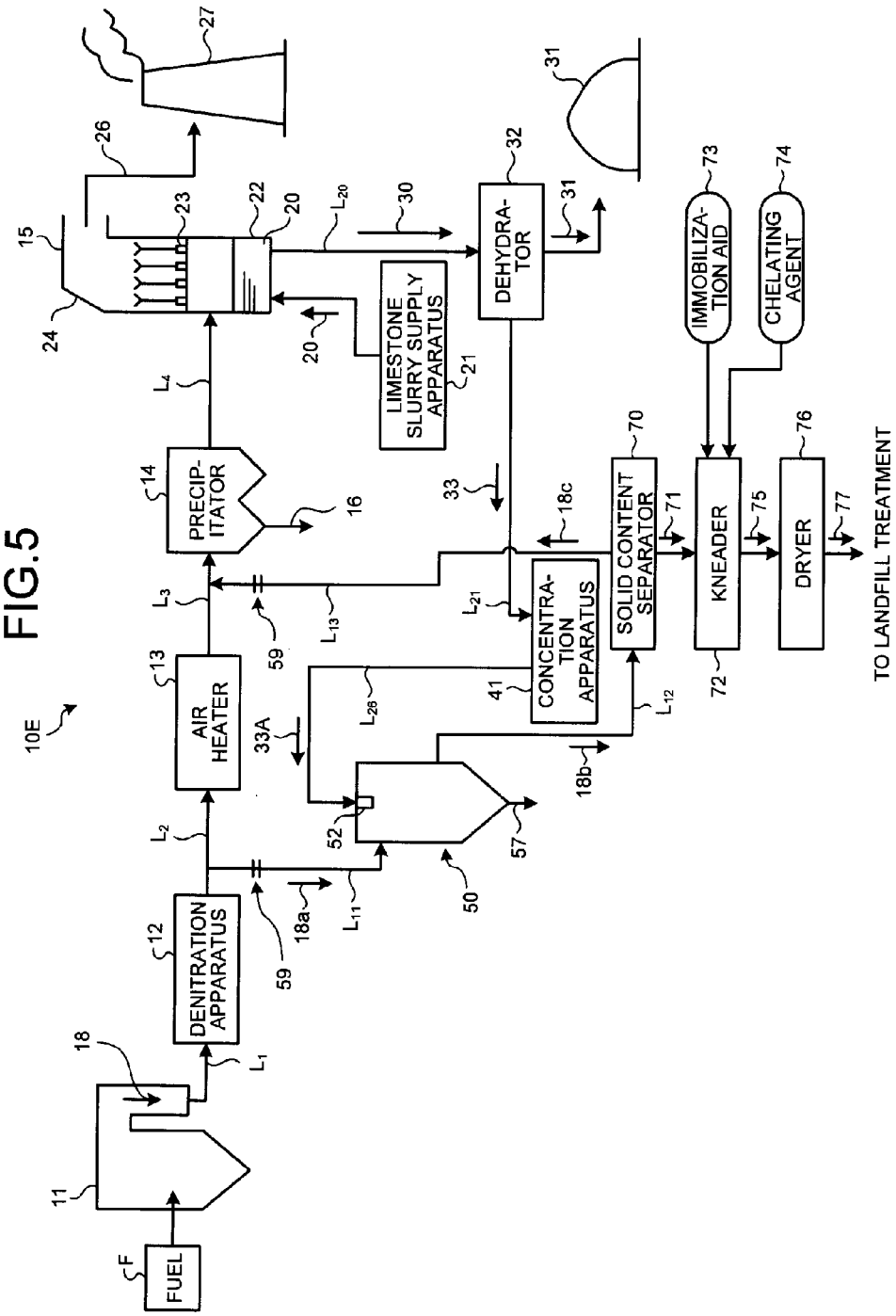
FIG. 5 is a schematic configuration diagram of another air pollution control system according to the fourth embodiment.

FIG. 5 is a schematic configuration diagram of another air pollution control system according to the fourth embodiment.

In an air pollution control system 10E for dehydrated filtrate according to the present embodiment illustrated in FIG. 5, a chelating agent 74 is added and mixed together with the immobilization aid 73 in the kneader 72 by which the solidification treatment is performed.

As water used to solidify each component by dissolving and mixing it, for example, steam or wastewater (desulfurization wastewater or the like), industrial water, or desulfurization absorbent slurry can be appropriately used.

In addition, the chelating agent 74 is concurrently charged at the time of the kneading treatment to immobilize heavy metals contained in the solid contents 71. In addition, as the chelating agent 74 to be used, for example, an amino carboxylic acid-based chelating agent such as EDTA chelating agent can be used.

A kneaded matter 75 to which the immobilization aid 73 and the chelating agent 74 are charged is then dried by the dryer 76, resulting in becoming the dry matter 77.

In addition, since salts dissolved in desulfurization wastewater are separated by the solid content separator 70 and the heavy metals are immobilized by the chelating agent 74, insolubilization of dry salts can be achieved and it is possible to prevent soil contamination due to elution of hazardous substances even when the dry salts are subjected to a landfill treatment.

Although the dry matter 77 is separately subjected to the landfill treatment, since it has been subjected to the immobilization treatment at the time of the landfill, the re-elution does not occur and the landfill treatment can be performed in consideration of an environment.

According to the present embodiment, since the dry salts generated in the spray drying apparatus 50 are subjected to the immobilization treatment using the immobilization aid 73 such as soot and dust and cement materials and the chelating agent 74, it is possible to immobilize the heavy metals and to perform an elution prevention (insolubilization) treatment.

Thus, the dry salts dried by the spray drying apparatus 50 are separated by the solid content separator 70 and the dry salts are immobilized, so that the insolubilization treatment is reliably performed. Accordingly, even when the dry matter 77 is subjected to the landfill treatment, the elution of the dry salts is reduced and the soil contamination due to the elution of the hazardous substance can be prevented.

REFERENCE SIGNS LIST 10A to 10E Air pollution control system
11 Boiler
12 Denitration apparatus
13 Air heater
14 Precipitator
15 Desulfurization apparatus
16 Collected dust ash
18 Flue gas
32 Dehydrator
33 Dehydrated filtrate
33A Concentrated/dehydrated filtrate
41 Concentration apparatus

The invention claimed is:

1. An air pollution control system comprising:
a boiler that is configured to combust a fuel;
an air heater that is configured to recover heat of a flue gas discharged from the boiler;
a precipitator that is configured to remove soot and dust contained in the flue gas after heat recovery;
a desulfurization apparatus that is configured to remove sulfur oxides contained in the flue gas after dust removal with an absorbent;
a solid-liquid separator that is provided downstream of the desulfurization apparatus and is configured to separate gypsum from desulfurized wastewater discharged from the desulfurization apparatus;
a concentration apparatus including a heater that is provided downstream of the solid-liquid separator and is configured to heat the resulting filtrate through the solid-liquid separator to make concentrated filtrate with the heater;
a flue gas introduction line that is branched from a main flue duct and is configured to branch the flue gas flowing therethrough;
a spray drying apparatus provided with a spray unit that is provided downstream of the concentration apparatus and is configured to spray-dry the concentrated filtrate with the flue gas introduced from the flue gas introduction line, the flue gas introduction line being connected to the spray drying apparatus; and
a flue gas supply line that is connected between the spray drying apparatus and the main gas duct and is configured to supply the flue gas discharged from the spray drying apparatus to the main flue gas duct.

2. The air pollution control system according to claim 1, wherein the concentration apparatus includes an evaporator configured to evaporate the filtrate which has been heated.

3. The air pollution control system according to claim 1, further comprising a filter that is disposed between the concentration apparatus and the spray drying apparatus and is configured to remove solid contents contained in the concentrated filtrate.

4. The air pollution control system according to claim 1, wherein the flue gas supply line is provided with a solid content separator that is configured to separate solid contents from the flue gas.

5. An air pollution control method in which after heat of a flue gas discharged from a boiler configured to combust a fuel is recovered by an air heater, sulfur oxides contained in the flue gas after heat recovery are removed using an absorbent in a desulfurization apparatus, the method comprising:
heating filtrate obtained by separating gypsum from desulfurized wastewater discharged from the desulfurization apparatus to make concentrated filtrate, using a concentration apparatus including a heater; and
spray-drying the concentrated filtrate, using some of the flue gas.

* * * * *